United States Patent
Udagawa et al.

(10) Patent No.: US 6,344,789 B1
(45) Date of Patent: Feb. 5, 2002

(54) VOLTAGE NON-LINEAR RESISTOR UNIT AND ARRESTER UNIT

(75) Inventors: Takeshi Udagawa; Masahiro Kan; Yoshihiro Ishizaki; Nobuyuki Shimizu; Hironori Suzuki; Hiroyoshi Narita, all of Yokohama; Yoshihiko Hirano; Hideyasu Andoh, both of Tokyo; Yasuhiko Taniguchi, Yokohama; Masahiro Hanai, Fujisawa; Masahiko Ebina, Yokohama; Keisuke Shimagami, Yokohama; Yoshiyasu Itoh, Yokohama; Takahiko Shindo, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 55 days.

(21) Appl. No.: 09/617,115

(22) Filed: Jul. 14, 2000

(30) Foreign Application Priority Data

Jul. 15, 1999 (JP) ............................................. 11-201672

(51) Int. Cl.[7] ................................................. H01C 7/10
(52) U.S. Cl. .............................. 338/21; 338/20; 361/127
(58) Field of Search ....................... 338/20, 21; 361/127, 361/128

(56) References Cited

U.S. PATENT DOCUMENTS

| 4,298,900 A | * 11/1981 | Avdeenko et al | ........... 361/127 |
|---|---|---|---|
| 4,423,404 A | * 12/1983 | Goedde et al. | ................ 338/21 |
| 5,930,102 A | * 7/1999 | Rook | .......................... 361/127 |
| 5,959,822 A | * 9/1999 | Bock et al. | .................. 361/117 |
| 5,994,995 A | * 11/1999 | Ogasawara et al. | ........... 338/21 |

FOREIGN PATENT DOCUMENTS

JP         10-55904         2/1998

* cited by examiner

Primary Examiner—Karl D. Easthom
(74) Attorney, Agent, or Firm—Oblon, Spivak, McClelland, Maier & Neustadt, P.C.

(57) ABSTRACT

A voltage non-linear resistor unit is composed of at least one of voltage non-linear resistors which is composed of a columnar sintered body formed by molding and sintering a raw material, the sintered body having both end surfaces having a surface roughness in term of arithmetic average surface roughness Ra of 1 to 2 μm and being formed with an electrode film layer, a terminal metal fitting formed in a predetermined shape and attached to the voltage non-linear resistor, and a soldering material arranged between the voltage non-linear resistors and between joint surfaces of the voltage non-linear resistor and the terminal metal fitting, the joint surfaces being joined by heating the soldering material and applying a load vertically to the joint surfaces while giving a rotation motion thereto. Such voltage non-linear resistor is effectively assembled into an arrester.

10 Claims, 12 Drawing Sheets

VOLTAGE NON-LINEAR RESISTOR UNIT
AND ARRESTER UNIT

BACKGROUND OF THE INVENTION

The present invention relates to a voltage non-linear resistor unit and an arrester unit used for a power system equipment.

In general, various resistors are used for a power system equipment. For example, a voltage non-linear resistor is used for an arrester used in an electric circuit which protects a power system from an abnormal voltage. A zinc oxide (ZnO)-based material, which is a ceramic material, is used as a base element of the voltage non-linear resistor. More specifically, a sintered body is used as the base element, which is prepared in the manner that, to the zinc oxide (ZnO) used as a main component, there are added an oxide such as bismuth (Bi), antimony (Sb), nickel (Ni), cobalt (Co), manganese (Mn), chromium (Cr), silicon (Si) or the like used as a secondary component, water and an organic binder added, and then, these components are sufficiently agitated. Thereafter, these components are granulated and molded by using a spray dryer or the like, and then, are sintered.

Moreover, a side of the sintered body is formed with a high resistance layer as occasion demands by applying and re-sintering a high resistance substance for preventing a creepage flash fault. Both ends of the sintered body are polished and are attached with an electrode film, and thus, a voltage non-linear resistor is manufactured. An arrester is constructed in a manner that one or plural voltage non-linear resistor elements are laminated or stacked, and then, are attached with a terminal metal fitting through an insulator. Moreover, in the arrester, a spring structure is employed for electrically connecting the terminal metal fitting.

As described above, since the spring structure is used in the arrester, the number of components is increased and a cost becomes high. In recent years, a power system equipment has been made into a small size in order to reduce a transmission cost, and it has been required to make small a structure of locating an insulator.

As prior art, in Japanese Patent Laid-Open Publication No. HEI 10-270214 and in Japanese Patent Laid-Open Publication No. HEI 10-275737, a plurality of zinc oxide sintering bodies are joined with each other by using a conductive material, and then, both end portions of the element joined are subjected to metalizing treatment, and further, is joined with a terminal metal fitting by a metallic material having a low melting point so that the element and the terminal metal fitting are formed as a unit. According to such process, there has been developed a voltage non-linear resistor unit which can reduce the number of components and can achieve a cost reduction.

However, in this type of voltage non-linear resistor unit, in the case where a junction between the voltage non-linear resistors and a junction between each voltage non-linear resistor and the terminal metal fitting is unsuitable, a uniform conductivity is hard to be obtainable. In other words, it is required that the junctions between the voltage non-linear resistors and between each voltage non-linear resistor and the terminal metal fitting are firmly made without losing a conductivity.

According to the conventional joining method, a conductive paste consisting of silver powder, glass powder and an organic binder is used as a conductive material, and glass powder contributing to a bonding strength is an insulator. The thus formed junction surface is inferior in a conductivity, and therefore, a uniform conductivity is hard to be obtainable. As a result, the following problem has arisen. That is, a current concentration is easy to be generated in discharge withstand current rating, and then, the discharge withstand current rating is decreased.

SUMMARY OF THE INVENTION

An object of the present invention is to provide a voltage non-linear resistor unit which can achieve a small size without lowering discharge withstand current rating.

Another object of the present invention is to provide an arrester unit provided with the voltage non-linear resistor unit of the character mentioned above.

These and other objects can be achieved according to the present invention by providing, in one aspect, a voltage non-linear resistor unit comprising:

at least one of voltage non-linear resistors which is composed of a columnar sintered body formed by molding and sintering a raw material, the sintered body having both end surfaces having a surface roughness in term of arithmetic average surface roughness (center line average surface roughness) Ra of 1 to 2 $\mu$m and being formed with an electrode film layer;

a terminal metal fitting formed in a predetermined shape and attached to the voltage non-linear resistor; and a soldering material arranged between the voltage non-linear resistors and between joint surfaces of the voltage non-linear resistor and the terminal metal fitting, the joint surfaces being joined by heating the soldering material and applying a load vertically to the joint surfaces while giving a rotation motion thereto.

In a preferred embodiment of this aspect, in a case of joining the voltage non-linear resistors together or joining the voltage non-linear resistor and the terminal metal fitting, a shift between central axes of one and the other joint surfaces is within a range of 0.1×R5 or less where R5 is a diameter of a smaller joint surface.

The sintered body of the voltage non-linear resistor is provided with a side surface to which an inorganic insulation coating material, which is formed with a high resistance layer containing mullite ($Al_6Si_2O_{13}$) as a main component and including $AlPO_4$ of 5.0 to 20 wt %, $TiO_2$ or $Fe_2O_3$ of 0.2 to 5 wt %, is preliminarily formed. A non-crystal high resistance layer including $SiO_2$ and $Al_2O_3$ as main component is further formed on the inorganic insulating coating material.

The electrode film formed on the sintered body is an electrode film composed of a plurality of layers comprising a first layer of Al or Al alloy and a second layer of Cu or Cu alloy.

The electrode film has a thickness of 300 $\mu$m or less. The soldering material contains Sn as a main component and contains at least one of Cu, Ag and Sb as a secondary component such that Sn is contained by 70 to 99%, Ag is contained by 3 to 20%, and Cu and Sb are contained by 5% or less.

In another aspect of the present invention, there is provided an arrester unit comprising:

a voltage non-linear resistor unit comprising at least one of voltage non-linear resistors which is composed of a columnar sintered body formed by molding and sintering a raw material, the sintered body having both end surfaces having a surface roughness in term of arithmetic average surface roughness Ra of 1 to 2 $\mu$m and being formed with an electrode film layer, a terminal metal fitting formed in a predetermined shape and attached to the voltage non-linear resistor, and a soldering material arranged between the voltage non-linear resistors and between joint surfaces of the voltage non-linear resistor and the terminal metal fitting, the joint surfaces being joined by heating the soldering material and applying a load vertically to the joint surfaces while giving a rotation motion thereto;

a thermosetting perforated insulating tube which covers portions of the voltage non-linear resistor unit except the terminal metal fitting of both end portions of the voltage non-linear resistor unit;

a metallic disc arranged in the terminal metal fitting of the voltage non-linear resistor unit so as to hold an end portion of the perforated insulating tube;

another terminal metal fitting provided through the metallic disc and engaged with a projected screw portion which has a disc-shaped surface joined with the voltage non-linear resistor and has a diameter of ⅓ of or more than a diameter of the first-mentioned terminal metal fitting formed on the joint surface side at the central portion of the first-mentioned terminal metal fitting; and an elastic insulation cover member covering an outer periphery of the perforated insulating tube.

In this aspect, the metallic disc includes a plurality of protrusions at a side facing the first-mentioned terminal metal fitting of the voltage non-linear resistor unit. The elastic insulating cover member is formed with a thin wall portion in one directional side.

According to the present invention of the structures and characters mentioned above, a clearance between the voltage non-linear resistors forming the electrode film and a clearance between both the end surfaces of the voltage non-linear resistor and the terminal metal fitting are joined by means of soldering material. Therefore, it is possible to provide a voltage non-linear resistor unit which has a compact size with reduced cost. Furthermore, since the bonding strength of the voltage non-linear resistors is high, it is possible to provide a voltage non-linear resistor unit with no peeling even if it receives an external force, an ambient temperature, and an internal heating effect.

Furthermore, these voltage non-linear resistor units are fully joined in its structure, and in the manufacturing of an arrester unit, in the case of covering these voltage non-linear resistor units with the perforated insulating tube and the elastic insulating cover member, these members are not held between the joint interfaces. Therefore, it is possible to prevent a corona generated in a voltage application without losing an electrical characteristic.

DESCRIPTION OF THE PREFERRED EMBODIMENTS

Embodiments of the present invention will be described hereunder with reference to the accompanying drawings.

Figure 1:
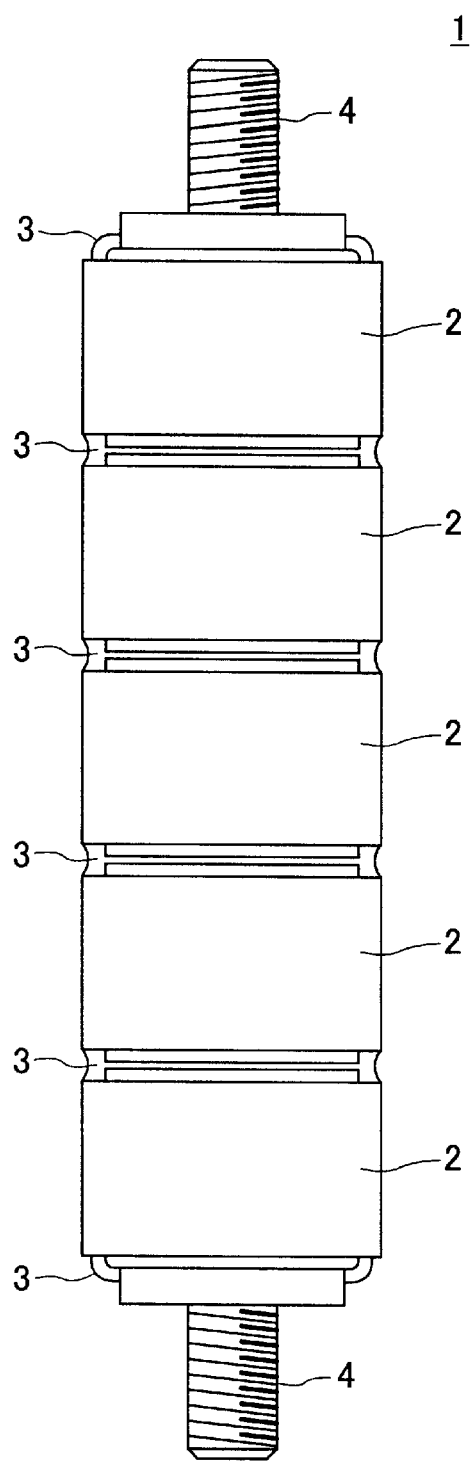
FIG. 1 is a view to explain a voltage non-linear resistor unit according to an embodiment of the present invention.

FIG. 1 is a view to explain a voltage non-linear resistor unit according to one embodiment of the present invention. A voltage nonlinear resistor unit 1 is capable of being mounted in a columnar (tubular) transformer and in a distributing board (switch board).

The voltage non-linear resistor unit 1 is formed in a manner that one or plural voltage non-linear resistors 2 are laminated or stacked, and both end portions of the laminated voltage non-linear resistor 2 are attached with a projected terminal metal fitting 4 having a screw (threaded) portion. A soldering material 3 is interposed between the voltage non-linear resistors 2 and between the voltage non-linear resistor 2 and the terminal metal fitting 4. In FIG. 1, there is shown a voltage non-linear resistor unit 1 which is formed by piling up five voltage non-linear resistors 2.

Each of the voltage non-linear resistors 2 is formed in the following manner. That is, a raw material is prepared in a manner that ZnO is used as a main component, and a micro amount of additives such as Bi is weighed by a predetermined amount as a secondary component. Then, the raw material is mixed with water and an organic binder such as a dispersant by a mixer. Next, the mixture is sprayed and granulated by a spray dryer so as to have a predetermined grain size of, for example, 100 μm. Subsequently, the granulated powder is put into a mold to be pressurized, and then, is molded into a cylindrical shape, and thus, a compact is obtained.

Figure 2:
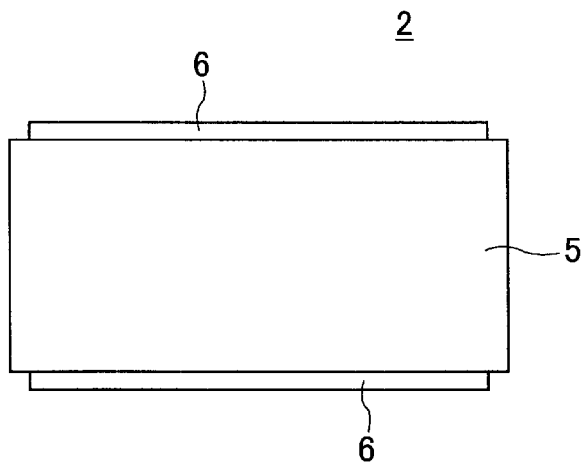
FIG. 2 is a front view showing one example of the voltage non-linear resistor unit according to the embodiment of the present invention.

The compact thus obtained is sintered in the air at a temperature of, for example, 500° C. in order to remove an added organic binder or like, and further, is sintered in the air at a temperature of 1200° C. for two hours, thus obtaining a sintered body 5 as shown in FIG. 2. Then, both end surfaces of the sintered body 5 are polished by using a grindstone having a surface roughness, in which an arithmetic average surface roughness (center line average surface roughness) Ra ranges from 1 to 2 μm, so as to form an electrode film surface. Moreover, a silver paste 6 preliminarily prepared at predetermined blending is applied to both the end surfaces, and thus, a voltage non-linear resistor 2 having an electrode film layer is obtained.

Thereafter, a soldering material 3 is arranged on the surface of the voltage non-linear resistor 2 which is formed with the electrode film, and then, a predetermined number, for example, 5 (five) voltage non-linear resistors 2 are piled up, and further, the terminal metal fitting 4 having a predetermined shape is arranged on each of both end surfaces of the voltage non-linear resistors 2 thus piled up. Further, the soldering material 3 is melted in the manner shown in FIG. 3 and FIG. 4.

Figure 3:
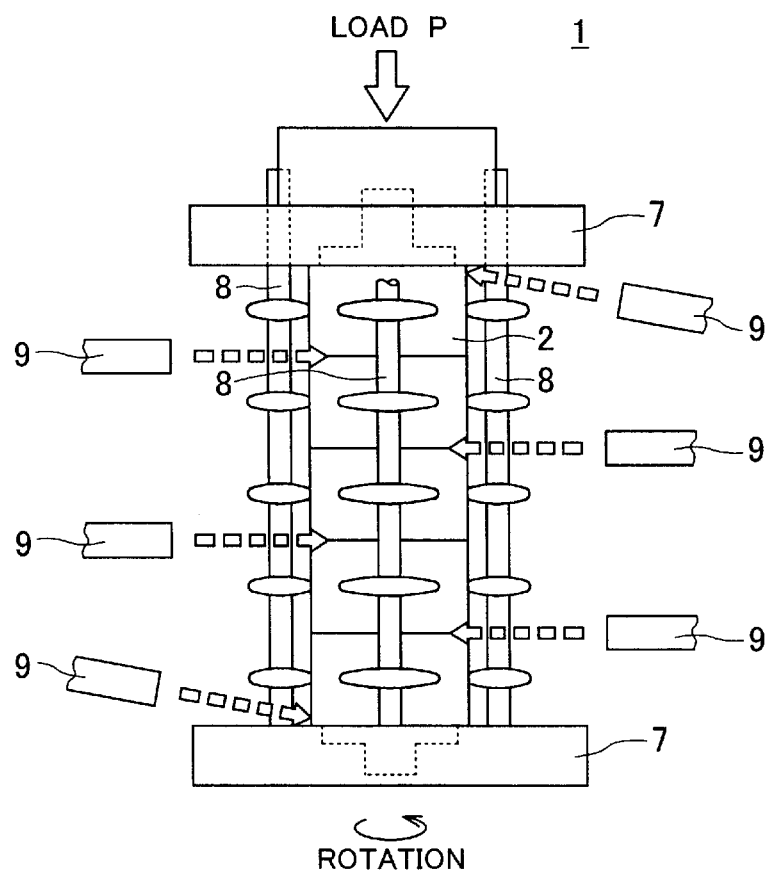
FIG. 3 is a front view to explain a manufacture of the voltage non-linear resistor unit according to the embodiment of the present invention.
Figure 4:
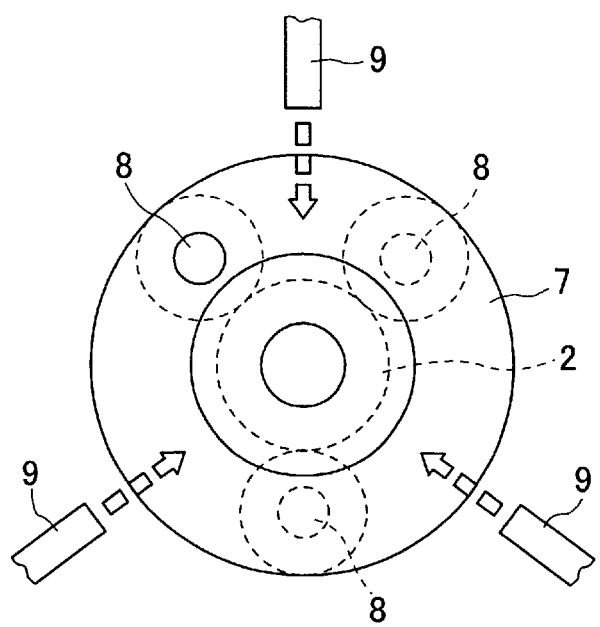
FIG. 4 is a top plan view to explain a manufacture of the voltage non-linear resistor unit according to the embodiment of the present invention.

As shown in FIG. 3 and FIG. 4, a voltage non-linear resistor unit 1 is set so as to be supported by using a supporting base 7 and a supporting rod 8 in a state of contacting to the voltage non-linear resistor 2 at a portion different from a joint surface between the voltage non-linear resistors 2 and between the voltage non-linear resistor 2 and the terminal metal fitting 4. Then, a local portion of the joint portion, on which a soldering material 3 is arranged, is heated by abutting a heat source 9 thereagainst to apply a load to the joint portion in the vertical direction while giving a rotation. In this case, a temperature is increased up to the maximum at a temperature rising speed of 60° C./min, and then, the maximum temperature is increased up to 30° C. or more than a melting point of the soldering material 3. Thereafter, the temperature is decreased at a temperature rising speed of 10° C./min, and thus, the voltage non-linear resistor unit 1 can be obtained.

It was confirmed that the voltage non-linear resistor unit 1 thus obtained has the same electrical characteristic as that in the case where five voltage non-linear resistors 2 are laminated via an insulator as in the conventional structure. In the above description, in the case of manufacturing the voltage non-linear resistor 2, a surface roughness of the sintered body 5 has been controlled by a grindstone. The surface roughness of the sintered body 5 may be subjected to a blasting working by using a powder having a predetermined grain size after being polished. In such a case, more uniform control can be performed.

Moreover, in the case where a porosity of the surface of the sintered body 5 is 15% or less, a strength of the base element is improved, and then, de-granulation is not caused in the grindstone polishing and blasting working, and therefore, it is possible to obtain a preferable bonding strength between the base element surface and the electrode film surface when forming an electrode film. In addition to these controls, there are further controls of a temperature rising speed in sintering and a retaining time, a compound ratio of binder and the like. It is the most effective to select a composition ratio for forming the voltage non-linear resistor 2.

More specifically, a composition ratio for forming the voltage non-linear resistor 2 is selected in the following manner. That is, ZnO is used as a main component, bismuth, cobalt, manganese, antimony and nickel are reduced to $Bi_2O$, $Co_2O_3$, $Sb_2O_3$ and NiO, respectively, and then, $Bi_2O_3$ is contained by 0.1 to 5 mol %, $Co_2O_3$ is contained by 0.1 to 5 mol %, MnO is contained by 0.1 to 5 mol %, $Sb_2O_3$ is contained by 0.1 to 5 mol %, and NiO is contained by 0.1 to 5 mol %, respectively, and thus, a fundamental component is prepared. Boron is contained in $B_2O_3$ by 0.001 to 1 wt %, and aluminum is reduced to $Al^{3+}$ and is contained by 0.05 mol % with respect to the fundamental component. A sintered body 5 is manufactured on the basis of a composition ratio comprising a ratio of $MnO/Sb_2O_3$ ranging from 0.3 to 1 and a ratio of $Sb_2O_3/Bi_2O_3$ ranging from 1 to 7.

The sintered body thus manufactured can reduce its porosity and improve the strength of base element. Therefore, the base element is hard to cause a de-granulation in the grindstone polishing and blasting working, and it is possible to obtain a preferable bonding strength between the surface on which the electrode film is formed and the electrode film surface.

Figure 5:
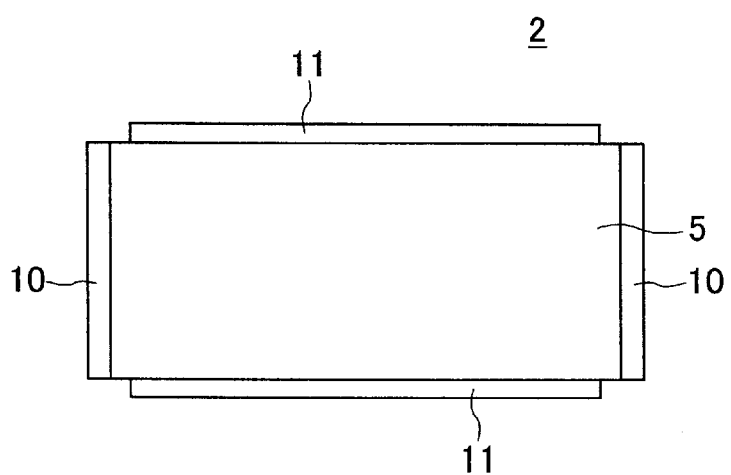
FIG. 5 is a front view showing another example of the voltage non-linear resistor unit according to the embodiment of the present invention.

The voltage non-linear resistor 2 may be formed as shown in FIG. 5, in place of the voltage non-linear resistor 2 shown in FIG. 2. More specifically, an inorganic insulating coating material 10 consisting mainly of a low melting point glass is applied and baked onto a side of the sintered body 5, and then, both sides of the sintered body 5 are polished at a predetermined surface roughness so as to form an electrode film surface. Subsequently, a Cu electrode film 11 is formed by an arc spraying method by using an arc discharge in place of the silver paste 6, and thus, a voltage non-linear resistor 2 is obtained.

The voltage non-linear resistor 2 thus obtained is excellent in an insulating characteristic in discharge by the inorganic insulating coating material 10 applied onto the side of the sintered body 5, and thus, its withstand current rating is improved. Moreover, the Cu electrode film 11 is excellent in a conductivity and a heat radiation is suppressed in its discharge, so that a thermal stress given to the soldering material 3 can be suppressed.

In this case, the Cu electrode film 11 has been formed by using an arc spraying method in place of the silver paste 6.

Further, even if the Cu electrode film 11 is formed in the following methods, the same effect could be obtained. That is, the methods include: a plasma spraying method of using a Cu alloy, e.g., a Cu—Zn alloy as an electrode film material, melting the material by a plasma heat source so that an electrode film is formed on the surface of a base element; a high velocity gas flame spraying method of spraying a material melted by using a high velocity gas flame to the surface of the base element at a high velocity so as to form an electrode film; and a high velocity spraying method of spraying a material at a high velocity so that an electrode film is formed on the surface of a base element.

Figure 6:
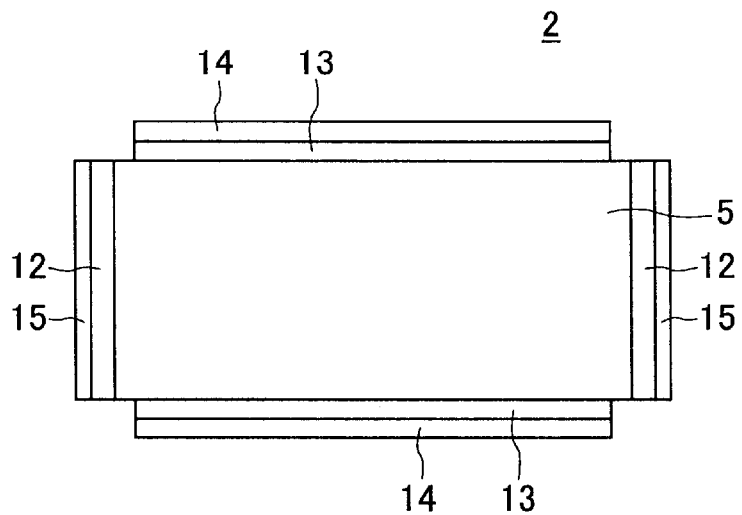
FIG. 6 is a front view showing still another example of the voltage non-linear resistor unit according to the embodiment of the present invention.

Further, a voltage non-linear resistor 2 as shown in FIG. 6 may be formed so as to improve the discharge withstand current rating characteristic and the bonding strength. More specifically, mullite is used as a main component of a side insulating coating material, and then, is baked at 400° C. after adding a predetermined amount of primary aluminum phosphate, $TiO_2$ or $Fe_2O_3$ thereto. Further, the sintered body 5 is formed with a high resistance layer 12 containing $AlPO_4$ using mullite as a main component of 0 to 20 wt %, and $TiO_2$ or $Fe_2O_3$ of 0.2 to 5 wt %, at the side thereof. Further, as occasion demands, a non-crystal high resistance layer 15 using $SiO_2$ and $Al_2O_3$ as a main component is further formed on the high resistance layer 12.

On the other hand, the sintered body 5 is polished at a predetermined surface roughness, and then, an Al or Al alloy layer is formed on the polished surface as a first electrode film 13, and further, a Cu or Cu alloy layer is formed on the polished surface as a second electrode film 14, and in this manner, the voltage non-linear resistor 2 is obtained.

Further, since an inorganic coating material of the high resistance layer 12 is used as the side insulating coating material, the boding strength with the sintered body 5 can be improved. Moreover, since the porosity of the side insulating coating material decreases, it is possible to provide the voltage non-linear resistor 2 which is excellent in the discharge withstand current rating. Further, in the case where the high resistance layer 15 is formed, it is possible to provide the voltage non-linear resistor 2 which can improve a water repellence and is excellent in a moisture resistance characteristic.

Moreover, aluminum or aluminum alloy having a low melting point and a low Young's modulus is used as the first electrode film 13, and then, is interposed between layers comprising Cu or Cu alloy which is the second electrode film 14. Therefore, it is possible to provide a voltage non-linear resistor 2 which has a more stable bonding strength.

In the above description, the bonding strength and discharge withstand current rating characteristics have been improved by using the voltage non-linear resistor 2 including a material for forming the electrode film and the insulating coating material. In addition, the state of forming the electrode film and the thickness of the electrode film give an influence to the discharge withstand current rating characteristic. Therefore, the voltage non-linear resistor unit including the electrode film having different thickness was previously manufactured by the voltage non-linear resistor 2 shown in FIG. 2, and then, a relationship with its discharge withstand current rating characteristic was investigated.

Figure 7:
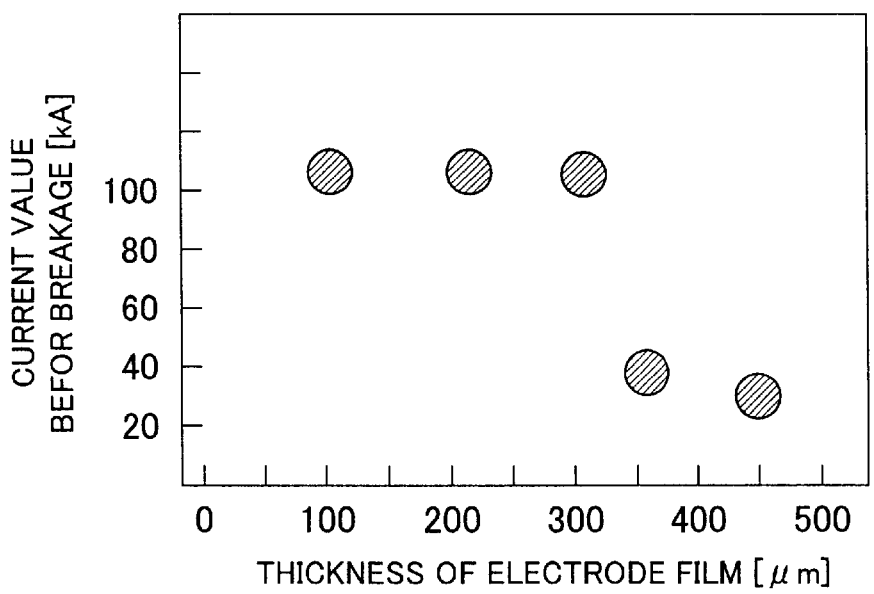
FIG. 7 is a graph showing a relationship between a thickness of electrode film and discharge withstand current rating in the embodiment of the present invention.

FIG. 7 is a graph showing a relationship between the thickness of the electrode film and the discharge withstand current rating in this embodiment of the present invention. In the graph, the abscissa takes a thickness of electrode film, and the ordinate takes a current value before breakage when energizing an impulse current, which is plotted. As is evident from FIG. 7, when the thickness of the electrode film exceeds 300 μm, the discharge withstand current rating characteristic is greatly reduced. In the above example, the voltage non-linear resistor 2 shown in FIG. 2 has been used. It was confirmed that the same effect can be obtained as in the case where the voltage non-linear resistor 2 shown in FIG. 5 and FIG. 6 is used.

Next, in order to investigate the bonding strength of the voltage non-linear resistor unit 1, a tensile strength test was carried out. More specifically, a jig is attached to a tap provided on the terminal metal fitting 4, and then, a tensile strength was measured. As a comparative example (conventional example), a voltage non-linear resistor unit 1 was prepared in the manner of using a conductive paste comprising a silver powder, a glass powder and a binder as a conductive material and then joining the voltage non-linear resistor 2. On the other hand, in the present invention, a voltage non-linear resistor unit 1 was prepared in the manner of using the voltage non-linear resistor 2 shown in FIG. 2 (silver paste+solder), the voltage non-linear resistor 2 shown in FIG. 5 (Cu+solder), and the voltage non-linear resistor 2 shown in FIG. 6 (Al+Cu/Zn+solder), and thereafter, a comparative test was performed.

Figure 8:
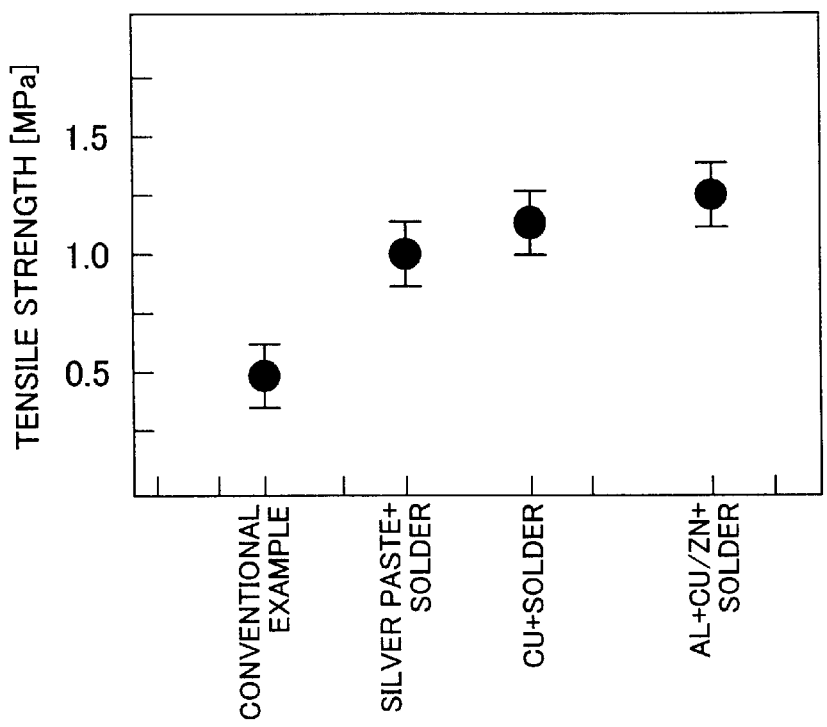
FIG. 8 a graph showing a relationship between a material of electrode film and a structure, and a tensile strength in the embodiment of the present invention.

FIG. 8 shows the comparative test result. In FIG. 8, a mark • shows a mean value, and a vertical straight line shows a dispersion. As is evident from FIG. 8, in the conventional example using a conductive paste comprising a silver powder, a glass powder and a binder as a conductive material, the bonding strength was about 0.5 MPa. On the contrary, in the present invention, the bonding strength of the voltage non-linear resistor unit 1 was about 1.0 MPa in the case of using the silver paste to the voltage non-linear resistor 2, about 1.2 MPa in the case where the Cu electrode film is formed, and 1.4 MPa or more in the case where Al sprayed film/Cu—Zn sprayed film was formed, and thus, a higher bonding strength could be obtained. Therefore, it can be seen that a preferable characteristic was obtained.

In the above example, the voltage non-linear resistor unit 1 has been obtained by using the supporting base 7 and the supporting rod 8 as shown in FIG. 3 and FIG. 4. The discharge withstand current rating characteristic greatly varies depending on differences in manufacturing method, shape of terminal metal fitting, form of joined state or the like. More specifically, when joining the voltage non-linear resistor 2, in the case of using no jig such as the supporting base 7 and the supporting rod 8, a shift is caused in the joint portion between the voltage non-linear resistors 2 and in the joint portion between the voltage non-linear resistor 2 and the terminal metal fitting 4. As a result, the discharge withstand current rating characteristic is reduced. Accordingly, the relationship between the shift in the joint portion and the discharge withstand current rating characteristic was investigated.

Figure 9:
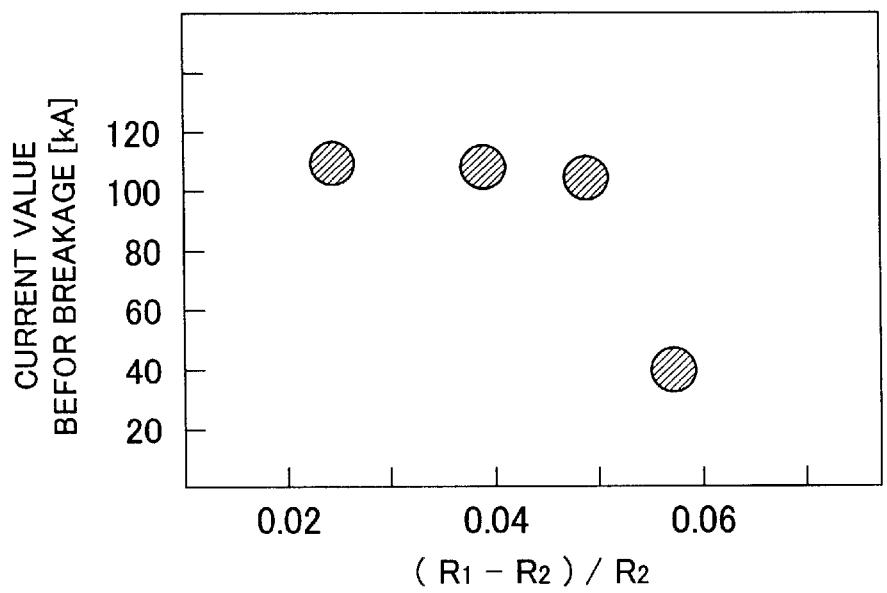
FIG. 9 is a graph showing a relationship between a shift between voltage non-linear resistors and discharge withstand current rating in the embodiment of the present invention.

FIG. 9 is a graph showing a relationship between the shift between the voltage non-linear resistors 2 and the discharge withstand current rating. The discharge withstand current rating test was performed in a manner that the voltage non-linear resistors 2 were joined to each other without using the jig such as the supporting base 7 and the supporting rod 8, and the terminal metal fitting 4 was not joined. A larger diameter of the voltage non-linear resistors 2 was set as R1 and a smaller diameter thereof was set as R2, and further, the abscissa takes (R1−R2)/R2, and the ordinate takes a current value before breakage when energizing an impulse current, which is plotted. As is evident from FIG. 9, when the value of (R1−R2)/R2 exceeds a value of 0.05, the discharge withstand current rating is greatly reduced.

Figure 10:
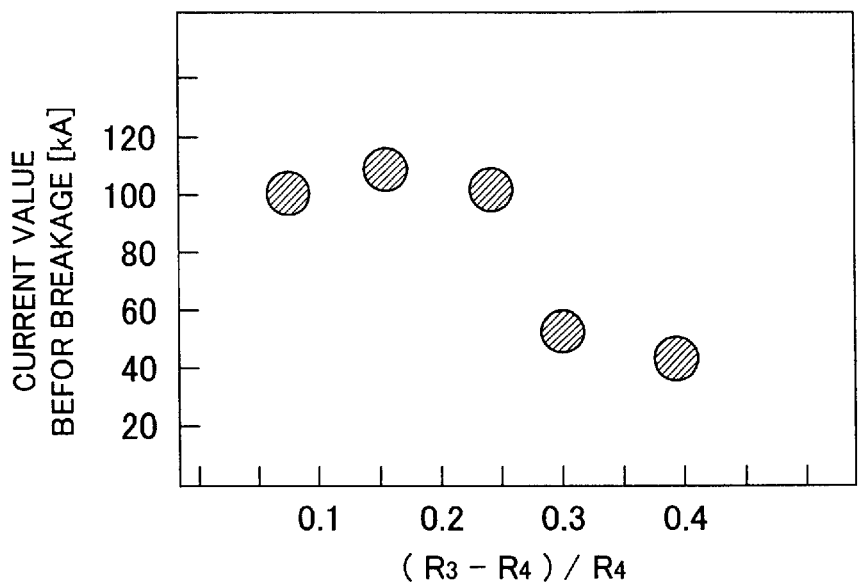
FIG. 10 is a graph showing a relationship between a terminal metal fitting, a position of the voltage non-linear resistor and discharge withstand current rating in the embodiment of the present invention.

FIG. 10 is a graph showing a relationship between the positions of the terminal metal fitting 4 and the voltage non-linear resistor 2 and the discharge withstand current rating. In FIG. 10, the discharge withstand current rating test was performed in a manner that the voltage non-linear resistor 2 was fixed by setting the jig such as the supporting base 7 and the supporting rod 8 as shown in FIG. 3 and FIG. 4, and the joint portion of the terminal metal fitting 4 was joined without setting the jig. A diameter of the terminal metal fitting 4 was set as R3, a diameter of the joint surface of the voltage non-linear resistor 2 was set as R4, and further, the abscissa takes (R3−R4)/R4, and the ordinate takes a current value before breakage when energizing an impulse current, which is plotted. As is evident from FIG. 10, in the case where the diameter of the terminal metal fitting 4 is larger than that of the voltage non-linear resistor 2, the discharge withstand current rating characteristic is greatly reduced. Moreover, when the value of (R3−R4)/R4 exceeds a value of 0.3, the discharge withstand current rating characteristic is greatly reduced.

Figure 11:
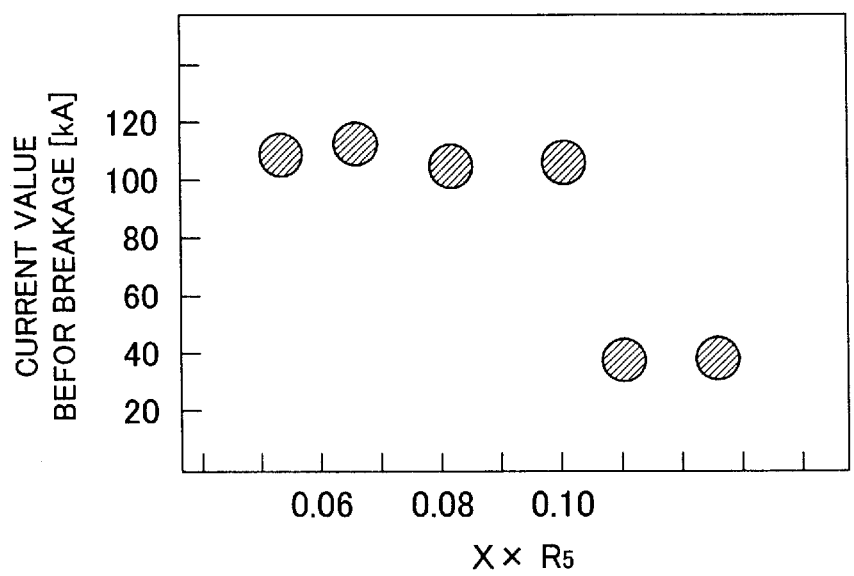
FIG. 11 is a graph showing a relationship between a shift from the central portion of a joint portion of the voltage non-linear resistor and discharge withstand current rating in the embodiment of the present invention.

FIG. 11 is a graph showing a relationship between a shift from the central portion of the joint portion of the voltage non-linear resistor and the discharge withstand current rating. In FIG. 11, a smaller diameter of one joint surface of the voltage non-linear resistor was set as R5, and the abscissa takes a difference in a shift between the central axis of one joint surface and the central axis of the other joint surface, and further, the ordinate takes a current value before the breakage when energizing an impulse current, which is plotted. As is evident from FIG. 11, in the case where the difference in the shift between the joint portions is larger than a value of 0.1×R5, the discharge withstand current rating characteristic was greatly reduced.

Next, the following factors will be considered as an influence given to the discharge withstand current rating characteristic of the voltage non-linear resistor 1. More specifically, the factors include the shift in the joint portion and the shape of the terminal metal fitting 4 and the manufacturing conditions as well as the shape of the voltage non-linear resistor 2 itself. Accordingly, the relationship between the shape of the voltage non-linear resistor 2 and the discharge withstand current rating was investigated.

Figure 12:
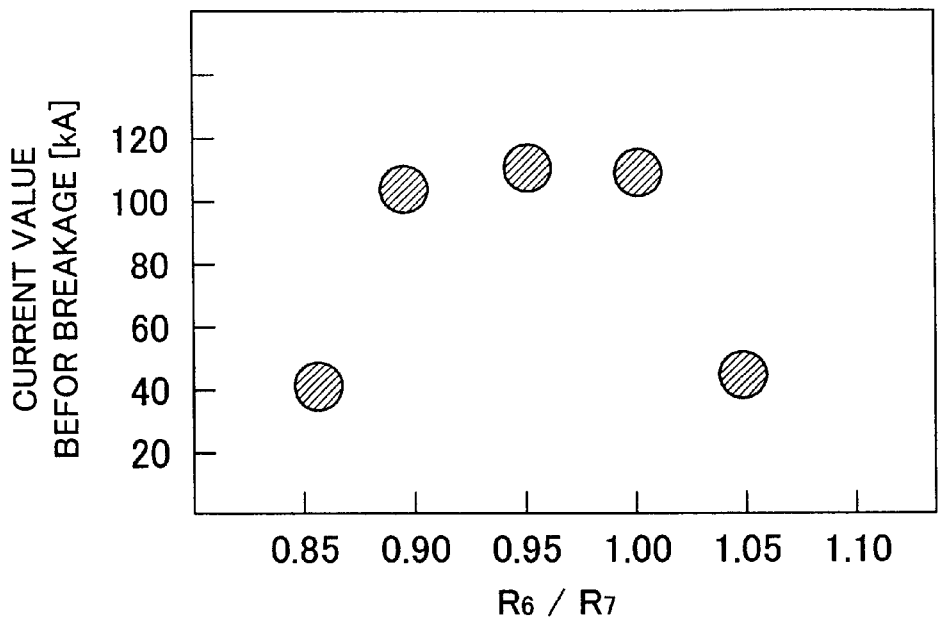
FIG. 12 is a graph showing a relationship between a shape of the voltage non-linear resistor and discharge withstand current rating in the embodiment of the present invention.

FIG. 12 is a graph showing a relationship between the shape of the voltage non-linear resistor 2 and the discharge withstand current rating. In FIG. 12, a diameter of the central portion of the voltage non-linear resistor 2 in a thickness direction was set as R6, and a diameter of the end portion thereof was set as R7, and then, the ratio of R7/R7 was measured. Thereafter, the voltage non-linear resistor unit 1 was manufactured by using the jig such as the supporting base 7 and the supporting rod 8, and then, the discharge withstand current rating test was carried out with respect to the voltage non-linear resistor unit 1 thus manufactured. In FIG. 12, the abscissa takes a ratio R6/R7, and the ordinate takes a current value before breakage when energizing an impulse current, which is plotted. As is evident from FIG. 12, when the ratio R6/R7 exceeds a range of 0.9≦R6/R7≦1, the discharge withstand current rating characteristic was greatly reduced.

Figure 13:
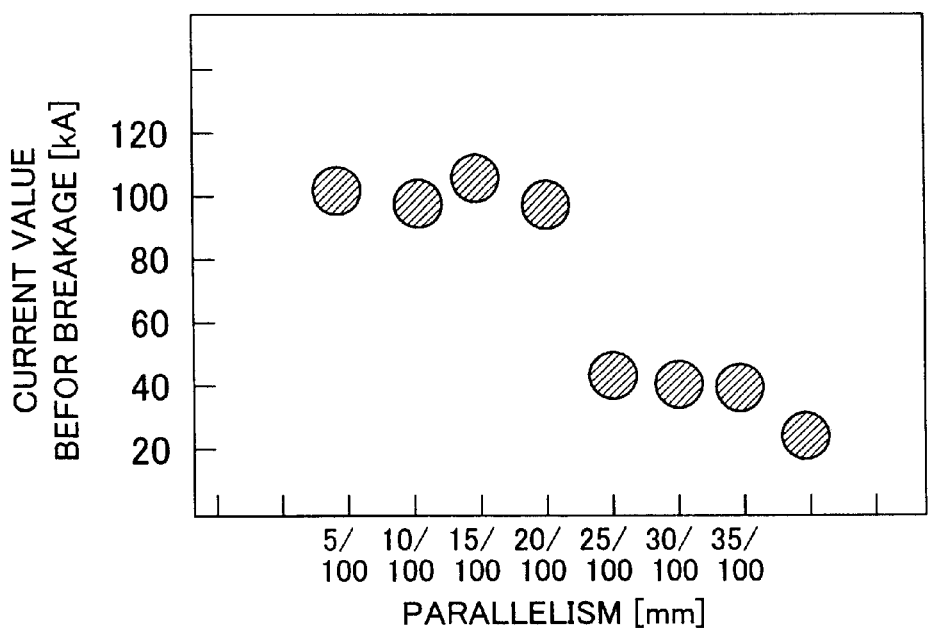
FIG. 13 is a graph showing a relationship between a parallelism of the voltage non-linear resistor and discharge withstand current rating in the embodiment of the present invention.

Moreover, not only the shape of the side of the voltage non-linear resistor 2 but also a parallelism of both the end faces thereof has a close relation to the discharge withstand current rating characteristic. Thus, the relationship between the parallelism of the voltage non-linear resistor 2 and the discharge withstand current rating was investigated. FIG. 13 is a graph showing a relationship between the parallelism of the voltage non-linear resistor 2 and the discharge withstand current rating. As is evident from FIG. 13, if the parallelism exceeds a value of 20/100, the discharge withstand current rating characteristic was greatly reduced.

Next, the following is a description on a voltage nonlinear resistor 2 in the case of using the specific soldering material 3. In general, an Sn—Pb based eutectic solder is used as the soldering material. It is preferable in term of prevention of environmental pollution to use a solder having a little content of Pb as the soldering material 3. Therefore, by using the soldering material 3 having a content of Pb by 0.1 wt % or less and a melting point of 210° C. or more, it is possible to provide the voltage non-linear resistor unit 1 which is excellent in the prevention of the environmental pollution.

Namely, there is used a soldering material in which Sn is used as a main component, and at least one of Cu, Ag and Sb is contained, and further, the soldering material consists of a low melting point metallic portion having a range such that Sn is 70 to 99%, Ag is 3 to 20% and Cu and Sb are 5% or less. The soldering material 3 is specially excellent in Young's modulus and a tensile strength, and the voltage non-linear resistor unit 1 using the soldering material has a stable bonding strength under a high temperature environment.

In order to compare a difference in a bonding strength at a temperature of 120° C. between the voltage non-linear resistor unit 1 using the soldering material 3 and the voltage non-linear resistor unit 1 using a Sn 60%—Pb 40% conventional soldering material which is a general low melting point metal, a test was carried out together with a comparative example. As shown in the following Table 1, 16 (sixteen) soldering materials 3 including the comparative example were prepared, and then, the bonding strength test was performed with respect to the voltage non-linear resistor unit 1. In the Table 1, a mark * shows the comparative example.

TABLE 1

| | Unit wt % | | at = 120° C. | | |
|---|---|---|---|---|---|
| No. | Sn | Cu | Ag | Sb | Pb | Bonding strength |
| 1 | 96.99 | 3.0 | 0 | 0 | 0.01 | 0.88 |
| 2 | 98.0 | 0 | 0 | 2.0 | 0 | 0.85 |
| 3 | 90.0 | 0 | 10.0 | 0 | 0 | 0.87 |
| 4* | 94.0 | 6.0 | 0 | 0 | 0 | 0.4 |
| 5* | 94.0 | 0 | 0 | 6.0 | 0 | 0.41 |
| 6* | 69.0 | 0 | 31.0 | 0 | 0 | 0.45 |
| 7 | 88.5 | 4.0 | 3.5 | 4.0 | 0 | 0.88 |
| 8* | 87.0 | 6.0 | 3.0 | 4.0 | 0 | 0.4 |
| 9* | 65.0 | 2.0 | 31.0 | 2.0 | 0 | 0.4 |
| 10* | 83.0 | 3.0 | 4.0 | 10.0 | 0 | 0.4 |
| 11 | 94.0 | 2.0 | 4.0 | 0 | 0 | 0.86 |
| 12 | 93.0 | 4.0 | 0 | 3.0 | 0 | 0.85 |
| 13 | 88.0 | 0 | 10 | 2.0 | 0 | 0.86 |
| 14* | 67.0 | 2.0 | 31.0 | 0 | 0 | 0.41 |
| 15* | 91.0 | 6.0 | 0 | 3.0 | 0 | 0.42 |
| 16* | 96.0 | 0 | 1.0 | 3.0 | 0 | 0.45 |

In this case, in the above test, each of the soldering materials 3 shown in the Table 1 was formed into a disc-shaped foil, and then, was interposed between the voltage non-linear resistor 2 shown in FIG. 6 and the terminal metal fitting 4. Thereafter, a flux was applied thereto, and a jig such as the supporting base 7 and the supporting rod 8 shown in FIG. 3 and FIG. 4 was used. Then, the voltage non-linear resistor unit 1 was heated under a predetermined condition, and thus, was manufactured. More specifically, the jig was attached to a tap provided in the terminal metal fitting 4, and then, the tensile strength was measured in a state that the voltage non-linear resistor unit 1 thus manufactured was inserted into a thermostatic oven at 120° C. The above test result was shown in the Table 1.

As is evident from the above Table 1, the voltage non-linear resistor unit 1 consisting of Pb of 0.1% or less, Ag of 3 to 20% or Cu and Sb of 5%, and the remainder of Sn, has a bonding strength of 0.85 MPa under a high temperature and is excellent in a strength characteristic. Therefore, it is possible to provide a voltage non-linear resistor unit 1 which is excellent in a stability.

In the above description, the voltage non-linear resistor 2 has been joined by applying a flux to the electrode film forming surface with the use of a low melting point metal foil as the soldering material 3. It is also possible to use a paste-like soldering material which is made by integrating a low melting point metal with a flux. It is preferable that the paste-like soldering material consists of a flux portion using a spherical low melting point metal portion having a diameter of 60 μm or less and zinc chloride as a main component. In the case of using the paste-like soldering material, a working efficiency can be improved.

Figure 14:
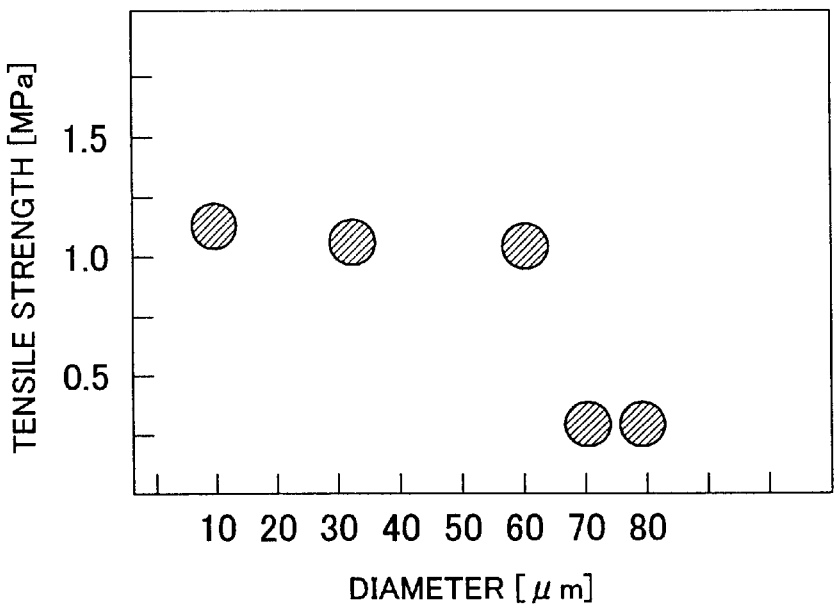
FIG. 14 is a graph showing a relationship between a diameter of a low melting point metal contained in a paste-like soldering material and a bonding strength in the embodiment of the present invention.

FIG. 14 is a graph showing a relationship between a diameter and a bonding strength of a low melting point metal contained in the paste-like soldering material. As is evident from FIG. 14, in the case where a diameter of the low melting point metal portion is 60 μm or more, a flux is previously volatile, and a wettability becomes worse, resulting in a reduced bonding strength.

Figure 15:
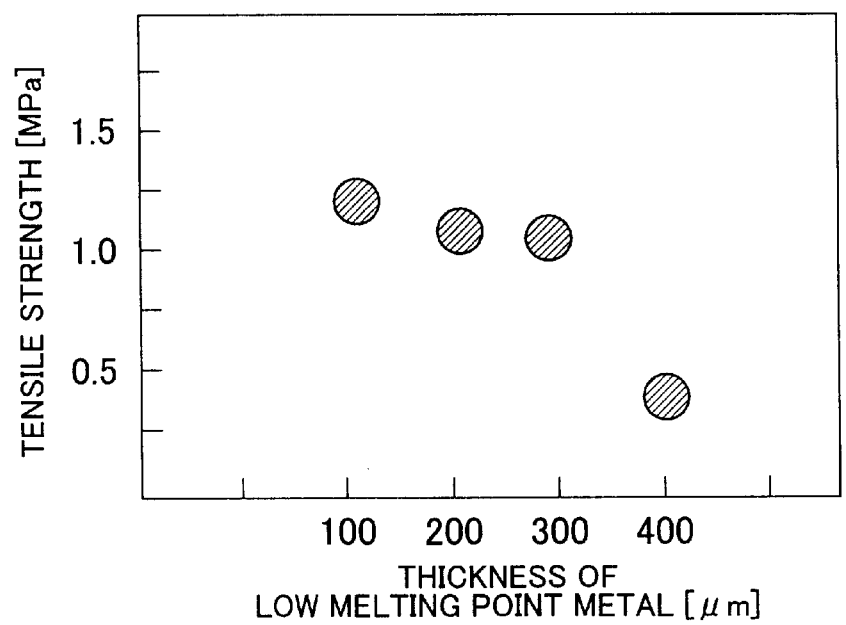
FIG. 15 is a graph showing a relationship between a thickness of a low melting point metal contained in a paste-like soldering material and a bonding strength in the embodiment of the present invention.

FIG. 15 is a graph showing a relationship between a thickness and a bonding strength of a low melting point metal contained in the paste-like soldering material. In FIG. 15, there is shown a relationship between the thickness of the low melting point metal and the discharge withstand current rating characteristic when the paste-like solder was applied to the voltage non-linear resistor 2, and then, the voltage non-linear resistors 2 were joined under a predetermined condition. As is evident from FIG. 15, when the thickness of the low melting point metal exceeds a value of 300 μm, the discharge withstand current rating characteristic was greatly reduced.

Figure 16:
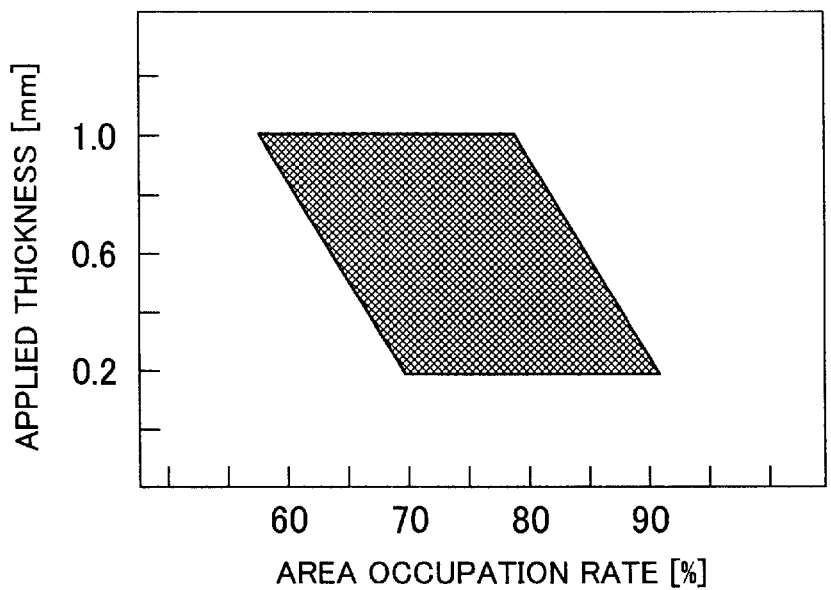
FIG. 16 is a graph showing a relationship between an applying condition of a paste-like soldering material and discharge withstand current rating in the embodiment of the present invention.

FIG. 16 is a graph showing a relationship between an applying condition of the paste-like soldering material and a discharge withstand current rating. In FIG. 16, a slanted portion shows a region where the discharge withstand current rating characteristic is 100 kA or more. As shown in FIG. 16, the paste-like soldering material occupies an area of 60 to 90% of the joint surface of the voltage non-linear resistors 2 and is formed so as to provide an applied thickness of 0.2 to 1 mm. Further, the following applying condition is set such that in a range from 60 to 70% of an area of the joined surface, an applied thickness is situated above a straight line connecting the terminations, and in a range from 80 to 90% thereof, the applied thickness is situated below the straight line connecting the terminations, and thereby, it is possible to control a thickness of the low melting point metal, after joined to 300 μm.

By applying the paste-like solder under the applying condition of the slanted portion shown in FIG. 16, it is possible to provide the voltage non-linear resistor 2 which is excellent in the discharge withstand current rating characteristic. Moreover, when joining the voltage non-linear resistors 2, a heat source is abutted against the joined surface while a load being vertically applied thereto, which is effective means for improving the bonding strength.

Figure 17:
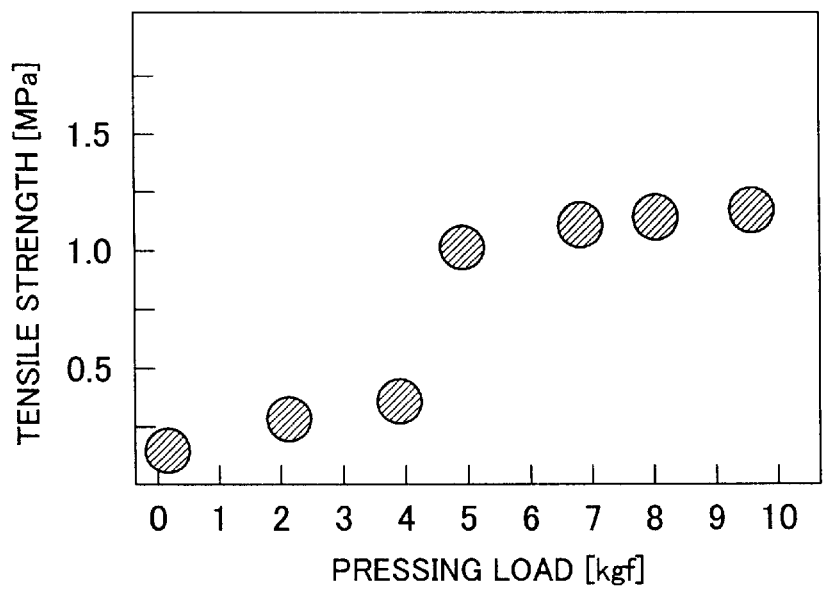
FIG. 17 is a graph showing a relationship between a compressive load when manufacturing the voltage non-linear resistor unit and a bonding strength in the embodiment of the present invention.

FIG. 17 is a graph showing a relationship between a compression load and a bonding strength when manufacturing a voltage non-linear resistor unit 1. In FIG. 17, the abscissa takes a pressing force in joining, and the ordinate takes a bonding strength. As is evident from FIG. 17, if the pressing force in the joining is 5 kgf or more, the voltage non-linear resistor unit 1 has a high bonding strength of 1.0 MPa. Therefore, it is possible to provide an excellent ZnO device unit. This is because the voltage non-linear resistor unit 1 is heated while a load in joining being applied thereto so as to reduce a pore of the solder.

Moreover, the shape of the soldering material after being joined gives an influence to the bonding strength. That is, the soldering material 3 is entirely spread to the joint outer peripheral surface between the voltage non-linear resistor 2 and the terminal metal fitting 4, and then, must be continuously and smoothly formed so as to provide a circular arc-shape from the side of the terminal metal fitting 4 to the joint surface of the voltage non-linear resistor 2. In order to form the shape as described above, when joining the soldering material 3, the heat source is abutted against a local portion of the joint portion while rotating voltage non-linear resistor 2.

By giving a heat collectively to the local portion of the joint portion by the heat source, the heat is not ridded by the voltage non-linear resistor 2, and therefore, the soldering material 3 can be effectively melted. At the time of being rotated, the heat can be transferred to the joint portion, and it is possible to continuously and smoothly form the soldering material in shape of a circular arc. In this case, since the joint is carried out while applying a load, the effect can be further obtained.

In this case, a generated heat is locally controlled by employing an induction heating method by arranging a coil around the terminal metal fitting 4 as the heat source 9, and using a high frequency current, a beam collection heating method of using a heat source such as a halogen lamp or the like, a burner heat method of using a burner, and a heat fan using an electric heating wire.

Figure 18:
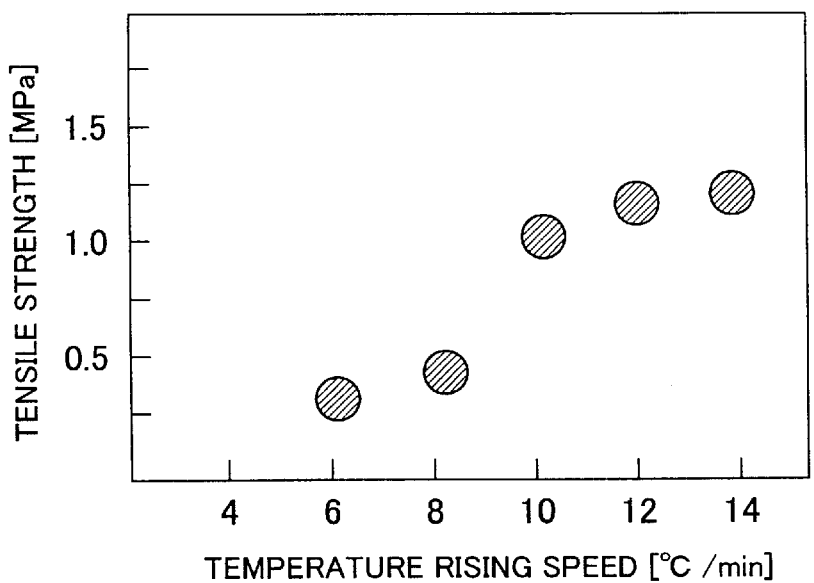
FIG. 18 is a graph showing a relationship between a temperature rising speed when heating a solder at a time of joining the voltage non-linear resistor unit and a bonding strength in the embodiment of the present invention.

Next, the above heating conditions will be described below. By using the heat source mentioned above, it is possible to make fast a temperature rising speed. If the temperature rising speed is slow, a flux is previously volatile, and therefore, it is impossible to sufficiently wet the low melting point metal and the base material. FIG. 18 shows a relationship between the temperature rising speed and the bonding strength. As is evident from FIG. 18, in the case where the temperature rising speed is 10° C./min or less, the bonding strength is greatly reduced.

The following is a description on an influence given by a material quality of the terminal metal fitting 4 and the shape thereof to the voltage non-linear resistor 2. It is desirable that the terminal metal fitting 4 is made of steel, copper and copper alloy. The bonding strength was investigated with respect to a voltage non-linear resistor unit 1 formed by using these materials and a voltage non-linear resistor unit 1 formed by using an aluminum material as a comparative example. In the above test, a jig was attached to a tap provided in the terminal metal fitting 4, and then, a tensile strength was measured. The test result is as shown in the following Table 2. In the Table 2, a mark * shows a comparative example.

TABLE 2

|  | Material quality of terminal metal fitting | Strength (MPa) |
| --- | --- | --- |
| 1* | aluminum alloy (AA2011) | 0.45 |
| 2 | steel material | 1.10 |
| 3 | copper (JIS C1020) | 1.05 |
| 4 | copper alloy (JIS C5212) | 1.12 |
| 5 | brass (JIS C2680) | 1.15 |

As is evident from the above result, when joining the terminal metal fitting 4 using steel, copper and copper alloy, the bonding strength is 1.0 MPa or more, and therefore, it is possible to provide a ZnO device unit which is excellent in the bonding strength. Moreover, it was confirmed that the same effects as those mentioned before can be obtained by the materials other than the those in the examples 2 to 5 shown in the Table 2, that is, steel, copper and a copper alloy.

In the examples 2 to 5, in the case where the terminal metal fitting 4 was made of an aluminum material, the bonding strength was greatly reduced. The terminal metal fitting 4 was subjected to a plating treatment, and thereby, it is possible to improve the bonding strength. That is, the terminal metal fitting 4 made of aluminum or an aluminum alloy was subjected to Ni, Sn or Zn plating, and thereafter, a voltage non-linear resistor unit 1 was manufactured. The bonding strength test was carried out with respect to the voltage non-linear resistor unit 1 thus manufactured in the same manner as in the above-described examples 2 to 5. The test result is shown in the following Table 3.

TABLE 3

| Base material: Aluminum (AA1050) | | |
| --- | --- | --- |
| No. | Plating material | Strength (MPa) |
| 1 | Ni | 1.05 |
| 2 | Sn | 1.12 |
| 3 | Zn | 1.05 |

As is evident from the above-described result, since the terminal metal fitting 4 is subjected to Ni, Sn or Zn plating, the bonding strength is 1.0 MPa or more, and therefore, it is possible to provide a ZnO device unit which is excellent in a bonding strength. Moreover, it was confirmed that the same effect can be obtained in the materials other than the examples 1 to 3 shown in the Table 3, that is, aluminum, an aluminum alloy steel, copper or a copper alloy.

The following is a description on an influence to the voltage non-linear resistor 2 given by a shape of the terminal metal fitting 4. That is, the terminal metal fitting 4 has a structure, in accordance with the shape of the voltage non-linear resistor 2, that the joint surface is formed like a disc, and then, the central portion on the side opposite to the joint surface is formed with a projected screw portion having a diameter of ⅓ of or more than the terminal metal fitting 4 of the jointed portion, and thus, the terminal metal fitting 4 is applied to the voltage non-linear resistor unit 1. Accordingly, it is possible to manufacture an arrester unit having a second terminal metal fitting described later fixed the terminal metal fitting 4 by a screw. In this case, the diameter of the projected screw portion has been set to ⅓ or more of the terminal metal fitting of the joint portion. The reason is because of preventing a deformation in the case where a load is applied in a transverse direction.

An influence to the bonding strength given by the maximum thickness of the terminal metal fitting 4 from the joint surface of the voltage non-linear resistor 2 was investigated.

That is, a plurality of voltage non-linear resistor units 1 having different thicknesses of mounting portions were manufactured, and then, a tensile strength test was performed. In the test, a jig was attached to a tap provided in the terminal metal fitting 4, and then, a tensile strength was measured. The result is shown in FIG. 19.

Figure 19:
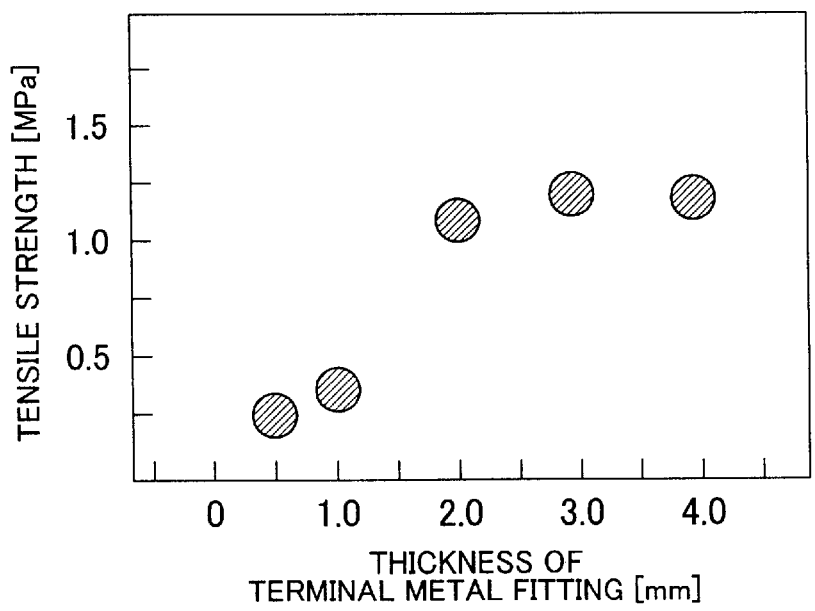
FIG. 19 is a graph showing a relationship between a thickness of the terminal metal fitting of the voltage non-linear resistor unit and a bonding strength in the embodiment of the present invention.

In FIG. 19, the abscissa takes the minimum thickness of the terminal metal fitting, and the ordinate takes a bonding strength. As is evident from the result, the minimum thickness of the joint portion of the terminal metal fitting 4 is set to 2 mm or more, and the bonding strength becomes 1.0 MPa or more. Therefore, it is possible to provide a ZnO device unit which is excellent in the bonding strength.

In the terminal metal fitting 4, since the surrounding of the joint surface is subjected to C-finishing or R-finishing, the surrounding of the joint surface is formed with a groove so that the soldering material 3 is easy to be stored. Thus, the soldering material 3 is uniformly spread around the terminal metal fitting 4. It is therefore possible to provide a voltage non-linear resistor unit 1 which has a stable bonding strength. A bonding strength was investigated with respect to the voltage non-linear resistor unit 1 using the terminal metal fitting 4 whose surrounding of the joint surface is subjected to C-finishing or R-finishing. The result is shown in the following Table 4.

TABLE 3

| No. | Kind of terminal finishing | Strength |
| --- | --- | --- |
| 1 | C-finishing (0.5 mm) | 1.23 |
| 2 | R-finishing (0.5 mm) | 1.25 |

As is evident from the above-described result, since the surrounding of the joint surface of the terminal metal fitting 4 is subjected to the C-finishing or R-finishing, the bonding strength becomes 1.0 MPa or more. Therefore, it is possible to provide a voltage non-linear resistor unit which is excellent in the stable bonding strength, whereby it becomes possible to securely join the voltage non-linear resistor 2 and to provide a voltage non-linear resistor unit 1 which can contribute to a compact size of transformer equipment.

Hereunder, another embodiment of the present invention relating an arrester unit utilizing the voltage non-linear resistor mentioned herein before.

Figure 20:
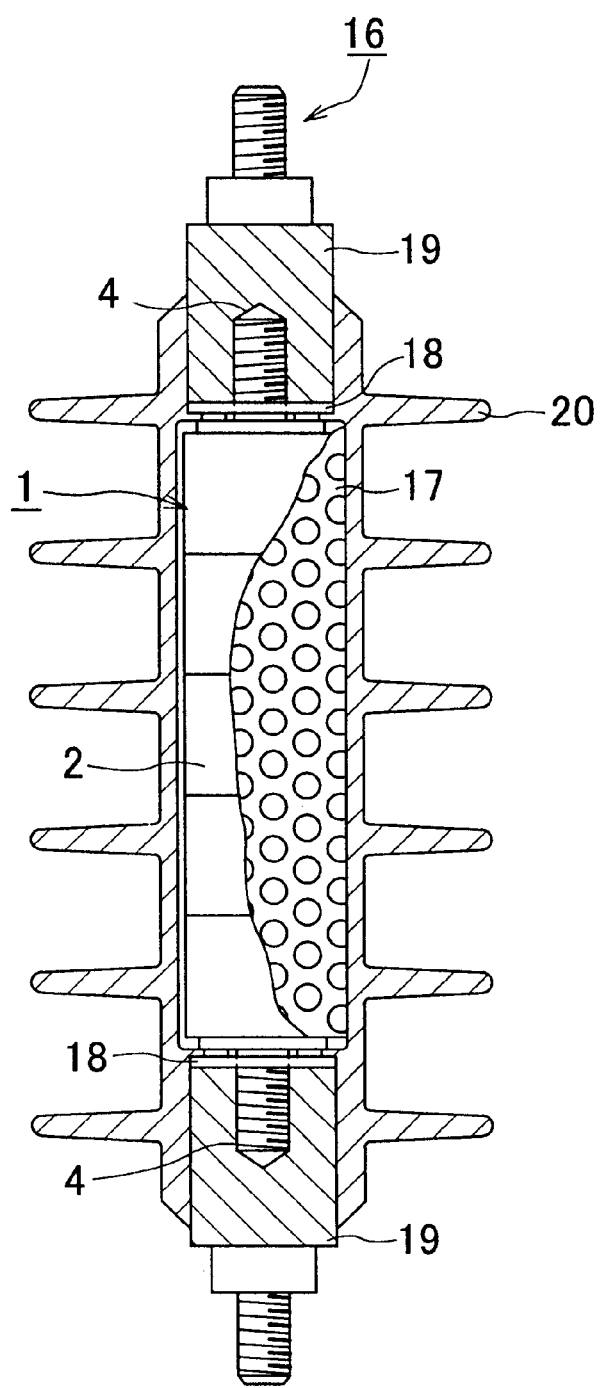
FIG. 20 is a cross sectional view showing an arrester according to an embodiment of the present invention.

FIG. 20 is a cross sectional view showing an arrester unit 16 according to one embodiment of the present invention. The arrester unit 16 is applicable to a column arrester, a distribution arrester, an arrester for transmission line and the like. As shown in FIG. 20, the arrester unit 16 is composed of a voltage non-linear resistor unit 1, a perforated insulative tube 17 covering the voltage non-linear resistor unit 1, a metallic disc 18 having a through hole, a second terminal metal fitting 19 attached to the terminal metal fitting 4 of the voltage non-linear resistor unit 1, and an elastic insulating cover member 20 covering the components other than the second terminal metal fitting 19.

The voltage non-linear resistor unit 1 manufactured in any one of the above-described embodiments is used. The voltage non-linear resistor unit 1 is covered with a thermosetting perforated insulating tube 17, and then, the metallic disc 18 is inserted into the projected screw portion of the terminal metal fitting 4 on both the end sides of the voltage non-linear resistor unit 1, and thereafter, the second terminal fitting 19 is fixed by means of screw so that the perforated insulating tube is held therebetween. Then, the unit thus assembled is put in a baking furnace, and then, is thermally hardened at a temperature of 200° C. or less. Subsequently, the unit is set in a mold having a predetermined shape and is covered by the elastic insulating covering member 20. Then, the unit is thermally hardened at a temperature of 200° C. or less, and thus, the arrester unit 16 can be obtained.

Figure 21:
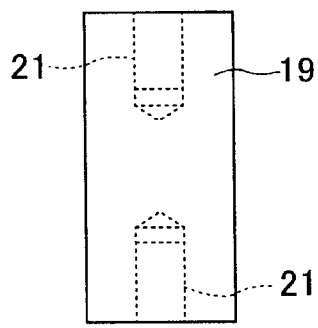
FIG. 21 is a front view showing one example of a second terminal metal fitting of the arrester according to an embodiment of the present invention.

In this case, the metallic disc 18 includes a plurality of convex protrusions at a side facing the voltage non-linear resistor unit 1, and the perforated insulating tube 17 can be firmly held. Moreover, in the case of arranging a plurality of the arrester units 16 in series, as shown in FIG. 21, the second terminal metal fitting 19 including a screw portion 21 at its both sides is used. More specifically, the second terminal metal fitting 19 can be engaged with the terminal metal fitting 4 of the voltage non-linear resistor unit 1 by means of screw and includes the screw portion 21 which is cylindrically extended and has a concave portion at the center of the upper portion so as to directly combine the arrester unit 16 in series.

Moreover, since the side portion of the second terminal metal fitting 19 is set to an arithmetic average surface roughness (central line average surface roughness) of 100 $\mu$m or more, the second terminal metal fitting 19 is preferably engaged with the elastic insulating cover member 20. Therefore, the elastic insulating cover member 20 is not peeled off even if it receives an external force, an ambient temperature and an internal heating effect. As a result, it is possible to prevent an insulative function from being reduced by sucking a moisture due to the peeling.

In the arrester unit 16, the voltage non-linear resistor unit 1 is covered with the thermosetting perforated insulating tube 17. This serves to prevent each component of the arrester from being scattered in the case where the arrester is broken by an excessive surge coming therethrough. Moreover, when an internal pressure rises up by an excessive surge coming therethrough, the internal pressure is uniformly dispersed, and it is possible to prevent a stress from being concentrated in breakage.

Figure 22:
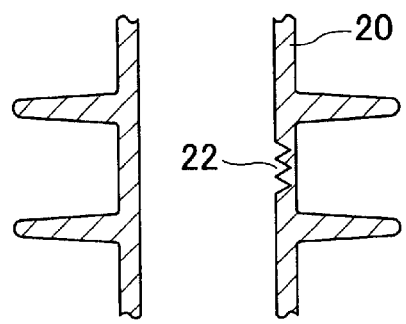
FIG. 22 is a cross sectional view showing one example of an elastic insulating cover member of the arrester according to an embodiment of the present invention.
Figure 23:
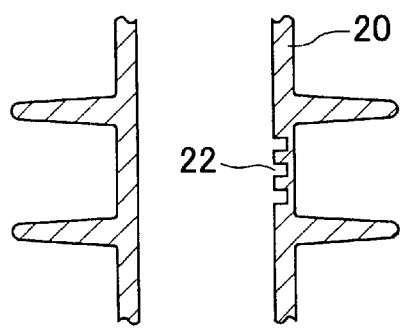
FIG. 23 is a cross sectional view showing another example of the elastic insulating cover member of the lightning arrester according to an embodiment of the present invention.

As shown in FIG. 22 and FIG. 23, the elastic insulating cover member 20 is formed with a thin wall portion 22 at one side. As shown in FIG. 22, the elastic insulating cover member 20 is formed with a slit-like thin wall portion 22 in a vertical direction, and as shown in FIG. 23, the elastic insulating cover member 20 is formed with a circular-shaped thin wall portion in a vertical direction. The thin wall portion 22 is formed so as to control an arc discharge to one direction.

Further, it is to be noted that the present invention is not limited to the described embodiments and many other changes and modifications may be made without departing from the scopes of the appended claims.

What is claimed is:

1. A voltage non-linear resistor unit comprising:
at least one of voltage non-linear resistors which is composed of a columnar sintered body formed by molding and sintering a raw material, said sintered body having both end surfaces having a surface roughness in term of arithmetic average surface roughness Ra of 1 to 2 $\mu$m and being formed with an electrode film layer;
a terminal metal fitting formed in a predetermined shape and attached to the voltage non-linear resistor; and
a soldering material arranged between the voltage non-linear resistors and between joint surfaces of the voltage non-linear resistor and the terminal metal fitting, said joint surfaces being joined by heating the soldering material and applying a load vertically to the joint surfaces while giving a rotation motion thereto.

2. A voltage non-linear resistor unit according to claim 1, wherein in a case of joining the voltage non-linear resistors together or joining the voltage non-linear resistor and the terminal metal fitting, a shift between central axes of one and other joint surfaces is within a range of 0.1×R5 or less where R5 is a diameter of a smaller joint surface.

3. A voltage non-linear resistor unit according to claim 1, wherein said sintered body of the voltage non-linear resistor is provided with a side surface to which an inorganic insulation coating material, which is formed with a high resistance layer containing mullite ($Al_6Si_2O_{13}$) as a main component and including $AlPO_4$ of 5.0 to 20 wt %, $TiO_2$ or $Fe_2O_3$ of 0.2 to 5 wt %, is preliminarily formed.

4. A voltage non-linear resistor unit according to claim 3, wherein a non-crystal high resistance layer including $SiO_2$ and $Al_2O_3$ as main component is further formed on the inorganic insulating coating material.

5. A voltage non-linear resistor unit according to claim 1, wherein said electrode film formed on the sintered body is an electrode film composed of a plurality of layers comprising a first layer of Al or Al alloy and a second layer of Cu or Cu alloy.

6. A voltage non-linear resistor unit according to claim 1, wherein said electrode film has a thickness of 300 $\mu$m or less.

7. A voltage non-linear resistor unit according to claim 1, wherein said soldering material contains Sn as a main component and contains at least one of Cu, Ag and Sb as a secondary component such that Sn is contained by 70 to 99%, Ag is contained by 3 to 20%, and Cu and Sb are contained by 5% or less.

8. An arrester unit comprising:
a voltage non-linear resistor unit comprising at least one of voltage non-linear resistors which is composed of a columnar sintered body formed by molding and sintering a raw material, said sintered body having both end surfaces having a surface roughness in term of arithmetic average surface roughness Ra of 1 to 2 $\mu$m and being formed with an electrode film layer, a terminal metal fitting formed in a predetermined shape and attached to the voltage non-linear resistor, and a soldering material arranged between the voltage non-linear resistors and between joint surfaces of the voltage non-linear resistor and the terminal metal fitting, said joint surfaces being joined by heating the soldering material and applying a load vertically to the joint surfaces while giving a rotation motion thereto;
a thermosetting perforated insulating tube which covers portions of the voltage non-linear resistor unit except the terminal metal fitting of both end portions of the voltage non-linear resistor unit;
a metallic disc arranged in the terminal metal fitting of the voltage non-linear resistor unit so as to hold an end portion of the perforated insulating tube;
another terminal metal fitting provided through the metallic disc and engaged with a projected screw portion which has a disc-shaped surface joined with the voltage non-linear resistor and has a diameter of ⅓ of or more than a diameter of the first-mentioned terminal metal fitting formed on the joint surface side at the central portion of the first-mentioned terminal metal fitting; and
an elastic insulation cover member covering an outer periphery of the perforated insulating tube.

9. An arrester unit according to claim 8, wherein said metallic disc includes a plurality of protrusions at a side facing the first-mentioned terminal metal fitting of the voltage non-linear resistor unit.

10. An arrester unit according to claim 8, wherein said elastic insulating cover member is formed with a thin wall portion in one directional side.

* * * * *